(12) United States Patent
Kim

(10) Patent No.: US 12,134,262 B2
(45) Date of Patent: Nov. 5, 2024

(54) DISPLAY DEVICE

(71) Applicant: Samsung Display Co., Ltd., Yongin-si (KR)

(72) Inventor: Min-Sung Kim, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 95 days.

(21) Appl. No.: 17/374,498

(22) Filed: Jul. 13, 2021

(65) Prior Publication Data

US 2022/0151082 A1 May 12, 2022

(30) Foreign Application Priority Data

Nov. 9, 2020 (KR) .................. 10-2020-0148908

(51) Int. Cl.
| | |
|---|---|
| *B32B 7/12* | (2006.01) |
| *B32B 3/16* | (2006.01) |
| *B32B 5/18* | (2006.01) |
| *B32B 15/08* | (2006.01) |
| *B32B 17/10* | (2006.01) |

(52) U.S. Cl.
CPC .................. *B32B 7/12* (2013.01); *B32B 3/16* (2013.01); *B32B 5/18* (2013.01); *B32B 15/08* (2013.01); *B32B 17/10* (2013.01); *B32B 2307/546* (2013.01); *B32B 2457/20* (2013.01)

(58) Field of Classification Search
CPC .................. G06F 1/1641; G06F 1/1652; H01L 2251/5338; G09F 9/301
See application file for complete search history.

(56) References Cited

U.S. PATENT DOCUMENTS

| | | | |
|---|---|---|---|
| 9,287,341 B2 | 3/2016 | Cheon et al. | |
| 9,857,957 B2 | 1/2018 | Lee et al. | |
| 9,923,156 B2 | 3/2018 | Jeong | |
| 11,175,693 B2 | 11/2021 | Song et al. | |

(Continued)

FOREIGN PATENT DOCUMENTS

| | | |
|---|---|---|
| KR | 10-2015-0142157 | 12/2015 |
| KR | 10-2016-0017843 | 2/2016 |

(Continued)

OTHER PUBLICATIONS

International Search Report, corresponding to International Application No. PCT/KR2021/011330 dated Dec. 7, 2021.

(Continued)

*Primary Examiner* — Alicia J Weydemeyer
(74) *Attorney, Agent, or Firm* — KILE PARK REED & HOUTTEMAN PLLC

(57) ABSTRACT

A display device includes a display panel which includes a first area, a second area that is folded and unfolded, and a third area sequentially disposed in a first direction, a barrier layer which is disposed below the display panel and includes at least one opening overlapping the second area, a first lower plate which is disposed below the barrier layer and overlaps the first area and a portion of the second area, and a second lower plate which is disposed below the barrier layer and overlaps the third area and another portion of the second area. A width of the at least one opening in the first direction may be less than a distance between the first lower plate and the second lower plate in the first direction.

20 Claims, 15 Drawing Sheets

(56) References Cited

U.S. PATENT DOCUMENTS

| | | |
|---|---|---|
| 11,523,524 B2 | 12/2022 | Myung et al. |
| 2018/0083211 A1* | 3/2018 | Lee .................... H01L 27/3276 |
| 2018/0192527 A1* | 7/2018 | Yun ....................... G06F 1/1681 |
| 2019/0305238 A1* | 10/2019 | Shin ....................... H01L 27/323 |
| 2019/0334114 A1 | 10/2019 | Park |
| 2020/0022267 A1 | 1/2020 | Han et al. |
| 2020/0105168 A1 | 4/2020 | Choi et al. |
| 2020/0242781 A1* | 7/2020 | Schwartz .............. G06F 16/745 |
| 2021/0399259 A1 | 12/2021 | Kim et al. |

FOREIGN PATENT DOCUMENTS

| | | |
|---|---|---|
| KR | 10-2017-0012739 | 2/2017 |
| KR | 10-2019-0003257 | 1/2019 |
| KR | 10-2019-0081281 | 7/2019 |
| KR | 10-2019-0081341 | 7/2019 |
| KR | 10-2020-0006646 | 1/2020 |
| KR | 10-2020-0036127 | 4/2020 |
| KR | 10-2020-0108754 | 9/2020 |
| KR | 10-2021-0157941 | 12/2021 |

OTHER PUBLICATIONS

Extended European Search Report for European Patent Application No. 21889354.3, dated Sep. 18, 2024.

* cited by examiner

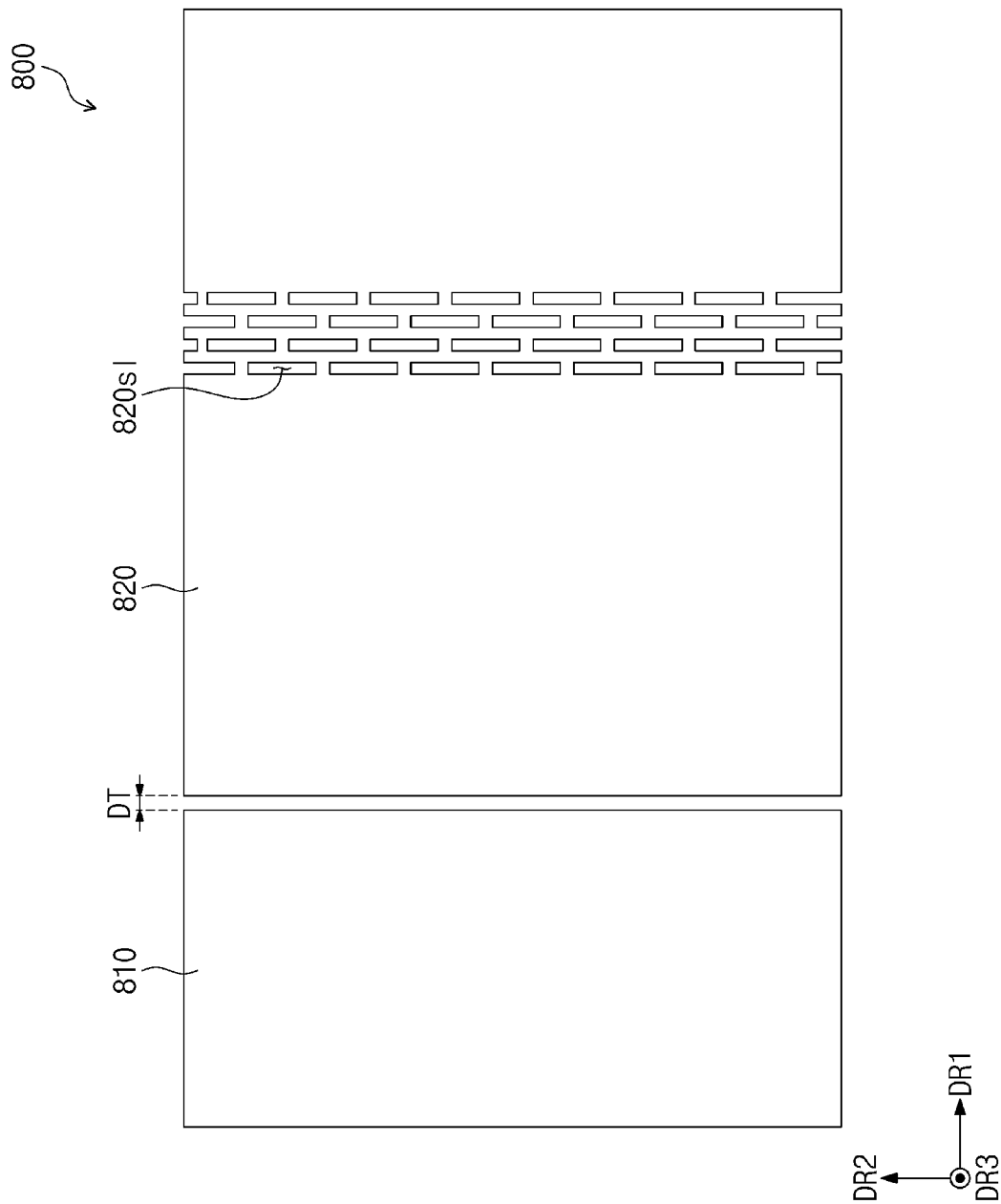

DISPLAY DEVICE

CROSS-REFERENCE TO RELATED APPLICATIONS

This U.S. non-provisional patent application claims priority to and the benefit of Korean Patent Application No. 10-2020-0148908 under 35 U.S.C. § 119, filed in the Korean Intellectual Property Office (KIPO) on Nov. 9, 2020, the entire contents of which are incorporated herein by reference.

BACKGROUND

1. Technical Field

The disclosure herein relates to a display device having improved product reliability.

2. Description of Related Art

Display devices provide users with information by displaying various images on a display screen. Generally, display devices display the information within an allocated screen. Recently, flexible display devices including a foldable flexible display panel have been developed. Such a flexible display device may be folded, rolled, or bent, unlike rigid display devices. The flexible display device deformable into various shapes may be carried irrespective of existing screen sizes, and thus, the user convenience may be improved.

SUMMARY

The disclosure provides a display device having improved product reliability.

An embodiment of the disclosure provides a display device including a display panel which includes a first area, a second area that is folded and unfolded, and a third area sequentially disposed in a first direction; a barrier layer which is disposed below the display panel and includes at least one opening overlapping the second area; a first lower plate which is disposed below the barrier layer and overlaps the first area and a portion of the second area; and a second lower plate which is disposed below the barrier layer and overlaps the third area and another portion of the second area. A width of the at least one opening in the first direction may be less than a distance between the first lower plate and the second lower plate in the first direction.

In an embodiment, the display panel may further include a fourth area and a fifth area which are disposed in the first direction from the third area, and the fourth area is folded and unfolded. The first area and the third area may face each other in case that the second area is folded, and the third area and the fifth area may be opposite to each other in case that the fourth area is folded.

In an embodiment, the second lower plate may overlap the third area, the fourth area, and the fifth area, and the barrier layer may overlap the first area, the second area, the third area, the fourth area, and the fifth area.

In an embodiment, the second lower plate may include a plurality of slits overlapping the fourth area.

In an embodiment, the barrier layer may overlap all of the plurality of slits in a plan view.

In an embodiment, the barrier layer may include a first barrier layer and a second barrier layer, and the first barrier layer and the second barrier layer may be separated from each other with respect to the at least one opening.

In an embodiment, the at least one opening may include a plurality of openings, and the plurality of openings may be arranged in a second direction intersecting the first direction.

In an embodiment, the display device may further include a first barrier adhesive layer attached to a top surface of the barrier layer; and a second barrier adhesive layer attached to a bottom surface of the barrier layer.

In an embodiment, the at least one opening may extend from the top surface of the barrier layer toward the bottom surface of the barrier layer, and at least one of the first barrier adhesive layer and the second barrier adhesive layer may overlap the at least one opening.

In an embodiment, the first barrier adhesive layer may include a first adhesive opening, and the second barrier adhesive layer may include a second adhesive opening. All of the first adhesive opening, the at least one opening, and the second adhesive opening may overlap each other.

In an embodiment, each of a width of the first adhesive opening in the first direction and a width of the second adhesive opening in the first direction may be greater than or equal to the width of the at least one opening in the first direction.

In an embodiment, each of a width of the first adhesive opening in the first direction and a width of the second adhesive opening in the first direction may be greater than about 0 and equal to or less than $\pi \times r$, wherein r is a radius of curvature of an uppermost surface of the display device corresponding to the second area in case that the second area is folded.

In an embodiment, the width of the at least one opening in the first direction may be greater than about 0 micrometer and equal to or less than about 100 micrometers.

In an embodiment, a modulus of elasticity of the barrier layer may be in a range of about 30 GPa to about 200 GPa.

In an embodiment, the barrier layer may include at least one of stainless steel, invar, glass, and a titanium alloy.

In an embodiment of the disclosure, a display device may include a display panel which includes a first area, a second area that is folded and unfolded, a third area, a fourth area that is folded and unfolded, and a fifth area sequentially disposed in a first direction; and a barrier layer which is disposed below the display panel and includes at least one opening overlapping the second area. The first area and the third area may face each other in case that the second area is folded, and the third area and the fifth area are opposite to each other when the fourth area is folded.

In an embodiment, a radius of curvature of an uppermost surface of the display device corresponding to the second area may be less than a radius of curvature of an uppermost surface of the display device corresponding to the fourth area.

In an embodiment, the display device may further include a first barrier adhesive layer attached to a top surface of the barrier layer; and a second barrier adhesive layer attached to a bottom surface of the barrier layer. At least one of the first barrier adhesive layer and the second barrier adhesive layer includes an adhesive opening overlapping the at least one opening.

In an embodiment, a width of the adhesive opening in the first direction may be greater than about 0 and equal to or less than $\pi \times r$, wherein r is a radius of curvature of an uppermost surface of the display device corresponding to the second area in case that the second area is folded.

In an embodiment, the display device may further include a first lower plate which is disposed below the barrier layer and overlaps the first area and a portion of the second area; and a second lower plate which is disposed below the barrier layer and overlaps the third area, the fourth area, the fifth area, and another portion of the second area. The second lower plate may include a plurality of slits overlapping the fourth area.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings:

FIG. 5 is a schematic plan view of a lower plate according to an embodiment of the disclosure;

DETAILED DESCRIPTION OF THE EMBODIMENTS

Figure 1:
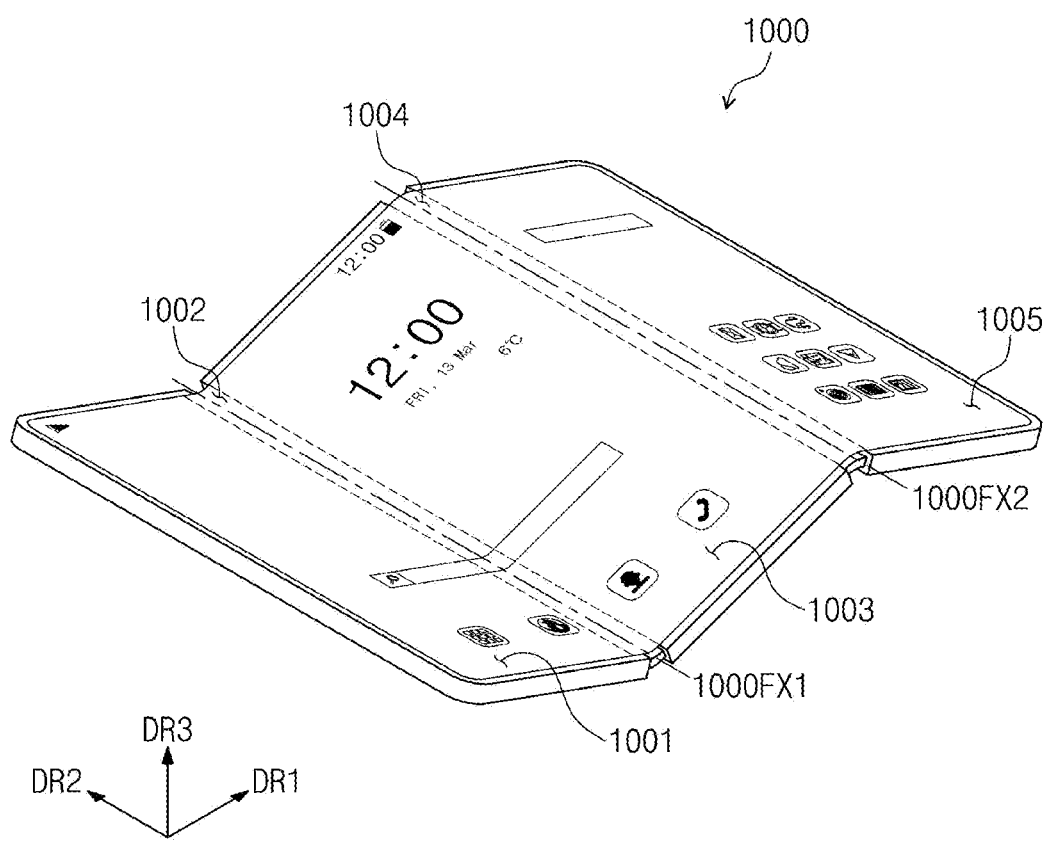
FIG. 1 is a schematic perspective view of a display device according to an embodiment of the disclosure.

In the specification, it will be understood that when an element (or a region, a layer, a portion, or the like) is referred to as being "on," "connected to" or "coupled to" another element, it can be directly disposed on, connected or coupled to another element mentioned above, or intervening elements may be disposed therebetween.

Like numbers refer to like elements throughout. Also, in the drawings, the thicknesses, ratios, and dimensions of the elements may be exaggerated for effective description of the technical contents.

The term "and/or" includes all of one or more combinations defined by related components.

Although the terms first, second, and the like may be used to describe various elements, these elements should not be limited by these terms. These terms are only used to distinguish one element from another element. For example, a first element may be referred to as a second element, and similarly, a second element may also be referred to as a first element without departing from the scope of the disclosure. The singular forms include the plural meanings unless the context clearly indicates otherwise.

Also, terms such as "below," "lower," "above," and "upper" may be used to describe the relationships of the components illustrated in the drawings. These terms have relative concepts and are described on the basis of the directions indicated in the drawings.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their dictionary-based meaning in the context of the relevant art and the disclosure, and should not be interpreted in an ideal or excessively formal sense unless clearly so defined herein.

It will be understood that the term "includes" or "comprises," when used in this specification, specifies the presence of stated features, integers, steps, operations, elements, components, or a combination thereof, but does not preclude the presence or addition of one or more other features, integers, steps, operations, elements, components, or combinations thereof.

Hereinafter, embodiments of the disclosure will be described with reference to the accompanying drawings.

Figure 2:
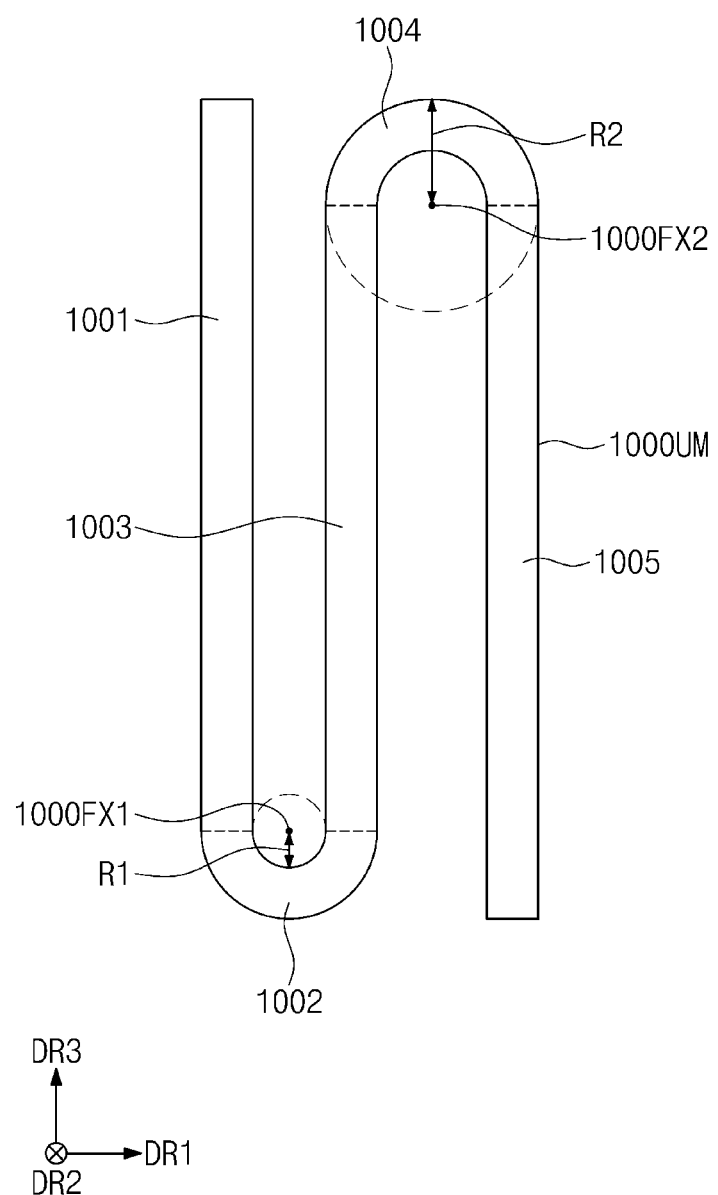
FIG. 2 is a schematic side view of a display device according to an embodiment of the disclosure.

FIG. 1 is a schematic perspective view of a display device according to an embodiment. FIG. 2 is a side view of a display device according to an embodiment.

Referring to FIGS. 1 and 2, a display device 1000 may be a device which is activated in response to an electrical signal. For example, the display device 1000 may be a mobile phone, a tablet personal computer (PC), a vehicle navigation system, a game console, or a wearable device, but the embodiment is not limited thereto.

The display device 1000 may be a foldable display device. In the display device 1000, a first device area 1001, a second device area 1002, a third device area 1003, a fourth device area 1004, and a fifth device area 1005 may be defined sequentially in a first direction DR1. The first device area 1001, the third device area 1003, and the fifth device area 1005 may be areas that are not folded and may be referred to as non-folding areas. The second device area 1002 and the fourth device area 1004 may be areas that are folded or unfolded. The second device area 1002 and the fourth device area 1004 may be foldable areas and thus may be referred to as folding areas or foldable areas.

The second device area 1002 may be an area that is foldable about a first folding axis 1000FX1 extending in a second direction DR2. The fourth device area 1004 may be an area that is foldable about a second folding axis 1000FX2 extending in the second direction DR2.

In case that areas of the display device 1000 are divided with respect to an uppermost surface 1000UM thereof, the first folding axis 1000FX1 and the second folding axis 1000FX2 may be defined in different areas. For example, the first folding axis 1000FX1 may be defined above the uppermost surface 1000UM, and the second folding axis 1000FX2 may be defined below the uppermost surface 1000UM.

In case that the display device 1000 is folded, the second device area 1002 may be folded about the first folding axis 1000FX1 defined above the uppermost surface 1000UM. Accordingly, the first device area 1001 and the third device area 1003 may face each other. Thus, in a state in which the display device 1000 is completely folded, the first device area 1001 and the third device area 1003 may face each other, and this may be referred to as in-folding.

In case that the display device 1000 is folded, the fourth device area 1004 may be folded about the second folding axis 1000FX2 defined below the uppermost surface 1000UM. Accordingly, the third device area 1003 and the fifth device area 1005 may be opposite to each other. Thus, in a state in which the display device 1000 is completely folded, the fifth device area 1005 may be exposed to the outside, and this may be referred to as out-folding.

A first radius R1 of curvature of the second device area 1002 may be less than a second radius R2 of curvature of the fourth device area 1004. The first radius R1 of curvature and the second radius R2 of curvature may be defined with respect to a same plane. For example, each of the first radius R1 of curvature and the second radius R2 of curvature may be defined with respect to the uppermost surface 1000UM of the display device 1000.

Figure 3A:
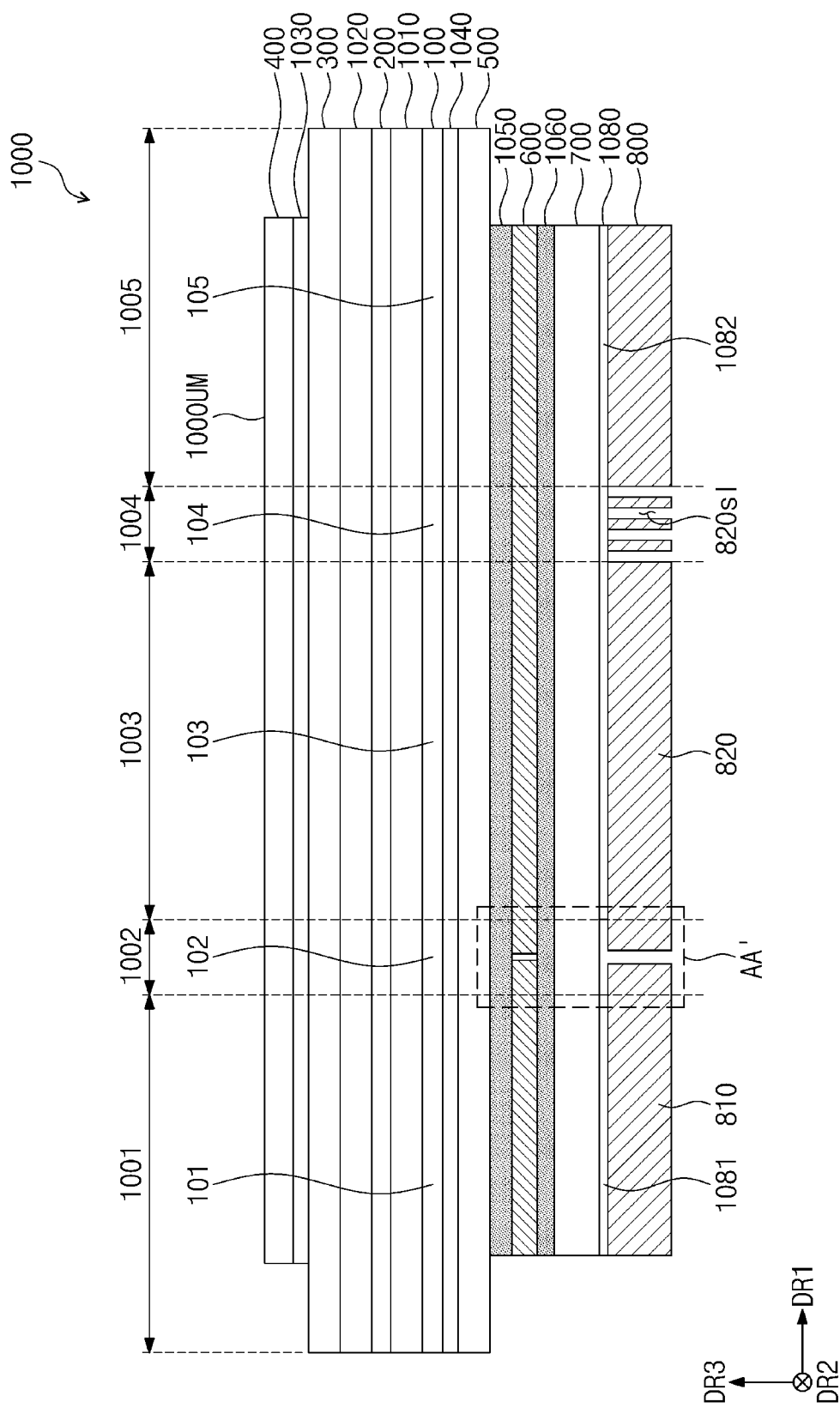
FIG. 3A is a schematic cross-sectional view of a display device according to an embodiment of the disclosure.
Figure 3B:
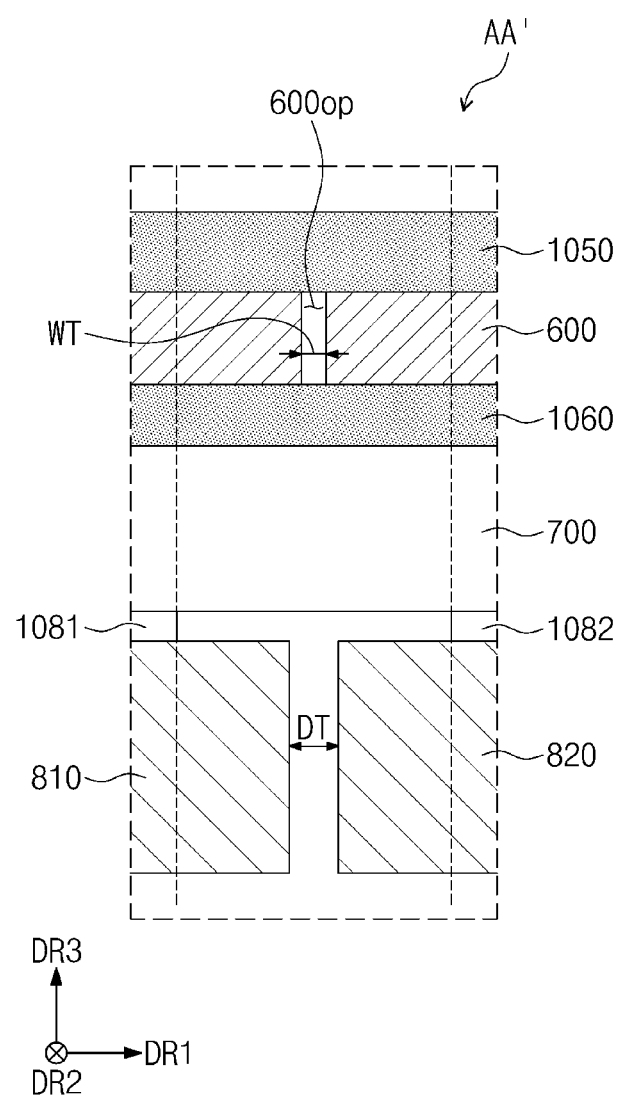
FIG. 3B is a schematic enlarged view illustrating AA' of FIG. 3A.

FIG. 3A is a schematic cross-sectional view of a display device according to an embodiment. FIG. 3B is a schematic enlarged view illustrating AA' of FIG. 3A.

Referring to FIGS. 3A and 3B, a display panel 100 may include components that generate an image and sense an input applied from the outside. For example, the display panel 100 may include a display layer and a sensor layer. The display layer may be a component that substantially generates an image, and may include, for example, an organic light emitting display layer, a quantum dot display layer, or a micro LED display layer. The sensor layer may be disposed above the display layer. The sensor layer may sense an external input applied from the outside. The external input may be a user's input. The user's input may include various types of external inputs such as a portion of the user's body, light, heat, a pen, or pressure.

The display panel 100 may include a first area 101, a second area 102, a third area 103, a fourth area 104, and a fifth area 105, which are defined in the first direction DR1. The first to fifth areas 101, 102, 103, 104, and 105 may overlap the first to fifth device areas 1001, 1002, 1003, 1004, and 1005 of the display device 1000, respectively. The first area 101, the third area 103, and the fifth area 105 may be areas that are not folded, and the second area 102 and the fourth area 104 may be areas that are foldable and unfoldable areas (or foldable and unfoldable areas). The thickness of the display panel 100 may be about 37 micrometers, but the embodiment is not particularly limited thereto.

In a state in which the display device 1000 is completely folded, the first area 101 and the third area 103 may face each other, and the third area 103 and the fifth area 105 may be opposite to each other. Facing each other may indicate that a direction, in which the first area 101 displays an image, is oriented toward the third area 103 and a direction, in which the third area 103 displays an image, is oriented toward the first area 101. Being opposite to each other may indicate that the direction, in which the third area 103 displays the image, is oriented away from the fifth area 105 and a direction, in which the fifth area 105 displays an image, is oriented away from the third area 103.

An anti-reflection member 200 may be disposed above the display panel 100. The anti-reflection member 200 may be referred as an anti-reflection layer. The anti-reflection member 200 may reduce the reflectivity of external light which is incident from the outside.

In an embodiment, the anti-reflection member 200 may include an elongated synthetic resin film. For example, the anti-reflection member 200 may be provided by dying a polyvinyl alcohol film (PVA film) with an iodine compound. However, this is merely an example, and a material constituting the anti-reflection member 200 is not limited to the example described above. The thickness of the anti-reflection member 200 may be about 31 micrometers, but the embodiment is not particularly limited thereto.

In an embodiment, the anti-reflection member 200 may include color filters. The color filters may have an arrangement. The arrangement of the color filters may be determined by taking into consideration colors of light emitted from pixels included in the display panel 100. The anti-reflection member 200 may also include a black matrix adjacent to the color filters.

In an embodiment, the anti-reflection member 200 may include a destructive interference structure. For example, the destructive interference structure may include a first reflection layer and a second reflection layer which are disposed on different layers. First reflection light and second reflection light, which are reflected from the first reflection layer and the second reflection layer, respectively, may destructively interfere with each other, and thus, the reflectivity of external light may be reduced.

The anti-reflection member 200 may be coupled to (or bonded or attached to) the display panel 100 by a first adhesive layer 1010. The first adhesive layer 1010 may be a pressure sensitive adhesive film (PSA), or a transparent adhesive layer such as an optically clear adhesive film (OCA) or an optically clear resin (OCR). The adhesive layer described below may include a general adhesive or bonding agent. The thickness of the first adhesive layer 1010 may be about 50 micrometers, but the embodiment is not particularly limited thereto.

In an embodiment, the first adhesive layer 1010 may be omitted, and the anti-reflection member 200 may be disposed directly on the display panel 100. A separate adhesive layer may not be disposed between the anti-reflection member 200 and the display panel 100.

A window 300 may be disposed above the anti-reflection layer 200. The window 300 may contain an optically transparent insulating material. For example, the window 300 may include a glass substrate or a synthetic resin film. In case that the window 300 is a synthetic resin film, the window 300 may include a polyimide (PI) film or a polyethylene terephthalate (PET) film.

The window 300 may have a multi-layer structure or a single-layer structure. For example, the window 300 may include synthetic resin films bonded to each other by an adhesive, or a glass substrate and a synthetic resin film which are bonded to each other by an adhesive.

The window 300 may be bonded to the anti-reflection member 200 by a second adhesive layer 1020. The second adhesive layer 1020 may be a PSA film, or a transparent adhesive layer such as an OCA film or an OCR. The thickness of the window 300 may be about 50 micrometers, but the embodiment is not particularly limited thereto. The thickness of the second adhesive layer 1020 may be about 50 micrometers, but the embodiment is not particularly limited thereto.

A protective film 400 may be disposed above the window 300. The protective film 400 may be further provided with a hard coating layer, an anti-fingerprint layer, or the like to enhance the characteristics of chemical resistance, wear resistance, or the like. The protective film 400 may include a film having a modulus of elasticity of about 15 GPa or less at room temperature, but the embodiment is not particularly limited thereto. As another example, the protective film 400 may include a polymer film or a tempered glass film. For example, the polymer film may include a polyethylene terephthalate (PET) film, a thermoplastic polyurethane (TPU) film, or a polycarbonate (PC) film, but the embodiment is not particularly limited thereto.

The protective film 400 may be bonded to the window 300 by a third adhesive layer 1030. The thickness of the protective film 400 may be about 45 micrometers, but the embodiment is not particularly limited thereto. The thickness of the third adhesive layer 1030 may be about 25 micrometers, but the embodiment is not particularly limited thereto. In an embodiment, the protective film 400 and the third adhesive layer 1030 may be omitted.

A lower protective film 500 may be bonded to the rear surface of the display panel 100 by a fourth adhesive layer 1040. The lower protective film 500 may prevent scratches from occurring on the rear surface of the display panel 100 during a process of manufacturing the display panel 100. The lower protective film 500 may be a colored polyimide film. For example, the lower protective film 500 may be an opaque yellow film, but the embodiment is not particularly limited thereto.

The thickness of the lower protective film 500 may be about 50 micrometers, but the embodiment is not particularly limited thereto. The thickness of the fourth adhesive layer 1040 may be about 25 micrometers, but the embodiment is not particularly limited thereto.

A barrier layer 600 may be disposed below the lower protective film 500. The barrier layer 600 may have a role in preventing foreign substances introduced from below the barrier layer 600 from being visually recognized from the outside. The barrier layer 600 may have characteristics (e.g., a modulus of elasticity) sufficient to prevent the shape thereof from being readily deformed by the foreign substances. For example, a modulus of elasticity of the barrier layer 600 may be between about 30 GPa and about 200 GPa. The barrier layer 600 may include stainless steel, invar, ultra-thin tempered glass, or a titanium alloy, but the embodiment is not particularly limited thereto. The thickness of the barrier layer 600 may be about 22 micrometers, but the embodiment is not particularly limited thereto. The modulus of elasticity may be referred to as Young's modulus or elastic modulus.

The second device area 1002 may be in-folded, and the fourth device area 1004 may be out-folded. The first radius R1 (see FIG. 2) of curvature of the second device area 1002 may be less than the second radius R2 (see FIG. 2) of curvature of the fourth device area 1004. The stress occurring in a portion of the barrier layer 600 disposed in the second device area 1002 may be greater than the stress occurring in a portion of the barrier layer 600 disposed in the fourth device area 1004. In an embodiment, an opening 600op may be provided in a portion of the barrier layer 600 and overlap the second area 102. For example, the opening 600op may be provided and overlap the second area 102 and the second device area 1002.

The opening 600op may be defined passing through the top surface and the bottom surface of the barrier layer 600. As the opening 600op is provided, the stress applied to the portion, of the barrier layer 600 overlapping the second area 102 may be reduced, the possibility that cracks occur in the barrier layer 600 may be reduced or eliminated.

A first barrier adhesive layer 1050 may be attached to the top surface of the barrier layer 600, and a second barrier adhesive layer 1060 may be attached to the bottom surface of the barrier layer 600. Each of the first barrier adhesive layer 1050 and the second barrier adhesive layer 1060 may include a general adhesive or bonding agent. The barrier layer 600 may be attached to the lower protective film 500 by the first barrier adhesive layer 1050. The thickness of each of the first barrier adhesive layer 1050 and the second barrier adhesive layer 1060 may be about 25 micrometers, but the embodiment is not particularly limited thereto. Each of the first barrier adhesive layer 1050 and the second barrier adhesive layer 1060 may cover the opening 600 op provided in the barrier layer 600.

A cushion layer 700 may be disposed below the barrier layer 600, and the cushion layer 700 may be attached to the barrier layer 600 by the second barrier adhesive layer 1060. The cushion layer 700 may include foam or sponge. The foam may be plastic foam. For example, the plastic foam may include polyurethane foam, polystyrene foam, or polyolefin foam, but the embodiment is not particularly limited thereto. In case that the cushion layer 700 includes the foam, the cushion layer 700 may include a barrier film (not shown) and foam (not shown) disposed on a surface of the barrier film. The thickness of the cushion layer 700 may be about 110 micrometers, but the embodiment is not particularly limited thereto.

A lower plate 800 may be disposed below the cushion layer 700. The lower plate 800 may be attached to the cushion layer 700 by a lower adhesive layer 1080. The lower plate 800 may include a first lower plate 810 and a second lower plate 820, and the lower adhesive layer 1080 may include a first lower adhesive layer 1081 and a second lower adhesive layer 1082. The thickness of each of the first lower plate 810 and the second lower plate 820 may be about 150 micrometers, but the embodiment is not particularly limited thereto. The thickness of each of the first lower adhesive layer 1081 and the second lower adhesive layer 1082 may be about 10 micrometers, but the embodiment is not particularly limited thereto.

The first lower plate 810 may overlap the first area 101 and a portion of the second area 102, and the second lower plate 820 may overlap the third area 103, the fourth area 104, the fifth area 105, and another portion of the second area 102. The first lower plate 810 and the second lower plate 820 may be spaced a predetermined distance from each other in portions thereof overlapping the second area 102.

The first lower plate 810 and the second lower plate 820 may support components disposed above the first lower plate 810 and the second lower plate 820, respectively. The heat dissipation capability of the display device 1000 may be improved by the first lower plate 810 and the second lower plate 820.

Each of the first lower plate 810 and the second lower plate 820 may have a modulus of elasticity of about 60 GPa or more. For example, each of the first lower plate 810 and the second lower plate 820 may be readily deformed.

Slits 820s1 may be provided in a portion, of the second lower plate 820, overlapping the fourth area 104. The shape of the portion, of the second lower plate 820, overlapping the fourth area 104 may be readily deformed by the slits 820s1. In a plan view (for example, when viewed from above in a third direction DR3), all of the slits 820s1 may be covered or overlapped by the barrier layer 600.

In a plan view, the first lower adhesive layer 1081 and the second lower adhesive layer 1082 may be spaced apart from each other with the second device area 1002 therebetween.

The first lower adhesive layer 1081 may overlap the first device area 1001, but may not overlap the second device area 1002. The second lower adhesive layer 1082 may overlap the third to fifth device areas 1003, 1004, and 1005, but may not overlap the second device area 1002. The phrase "in a plan view" may be used in the same meaning as viewed in the third direction DR3 or in the thickness direction of the display device 1000.

Although not illustrated in the drawings, level-difference compensating films may be further disposed between the cushion layer 700 and the first lower plate 810 overlapping the second area 102 and between the cushion layer 700 and the second lower plate 820 overlapping the second area 102. The adhesion force on a surface of each of the level-difference compensating films may be lower than the adhesion force on another surface thereof. For example, the surface may not have adhesion force. The surface may be a surface facing the first lower plate 810 or the second lower plate 820.

Referring to FIG. 3B, a width WT of the opening 600op of the barrier layer 600 may be smaller than a distance DT between the first lower plate 810 and the second lower plate 820. All of the distance DT and the width WT may represent the distance and width parallel to the first direction DR1.

The width WT may be equal to or less than half the distance DT. For example, the width WT may be about 100 micrometers, and the distance DT may be about 700 micrometers. However, the values mentioned above are merely an example, and the embodiment is not particularly limited thereto.

The width WT of the opening 600op may be greater than about 0 micrometer and equal to or less than about 100 micrometers. In case that the width WT of the opening 600op is about 0, for example, in case that the opening 600op is not provided in the barrier layer 600, a crack may occur in the barrier layer 600. In addition, in case that the width WT of the opening 600op is greater than about 100 micrometers, the durability against an external impact to a portion corresponding to the opening 600op may be deteriorated. Since the ability of blocking foreign substances introduced from below the barrier layer 600 is deteriorated, a defect may occur in the display panel 100 due to the foreign substances, and the opening 600op may be visually recognized from the outside.

In an embodiment, the width WT of the opening 600op may be less than the distance DT between the first lower plate 810 and the second lower plate 820 and may be equal to or greater than about 0 micrometer and equal to or less than about 100 micrometers. Therefore, the possibility that a crack occurs in the barrier layer 600 may be reduced, and thus, the folding reliability of the display device 1000 may be ensured. Even though the opening 600op is provided, the possibility that the opening 600op of the barrier layer 600 is visually recognized from the outside and the possibility that foreign substances are introduced through the opening 600op may be reduced.

In case that the display device 1000 is completely folded, a first portion of the barrier layer 600 overlapping the second area 102 may be bent to have a smaller radius of curvature than a second portion of the barrier layer 600 overlapping the fourth area 104. Therefore, stress applied to the first portion may be greater than that applied to the second portion. In an embodiment, the opening 600op may be provided in only a portion of the barrier layer 600 overlapping the second area 102 but may not be provided in a portion thereof overlapping the fourth area 104.

An embodiment is not limited to the stacking relationship illustrated in FIG. 3A. For example, some components except for the display panel 100, the barrier layer 600, the first lower plate 810, and the second lower plate 820 may be omitted, and other components in addition to the components illustrated in FIG. 3A may be added.

Figure 4A:
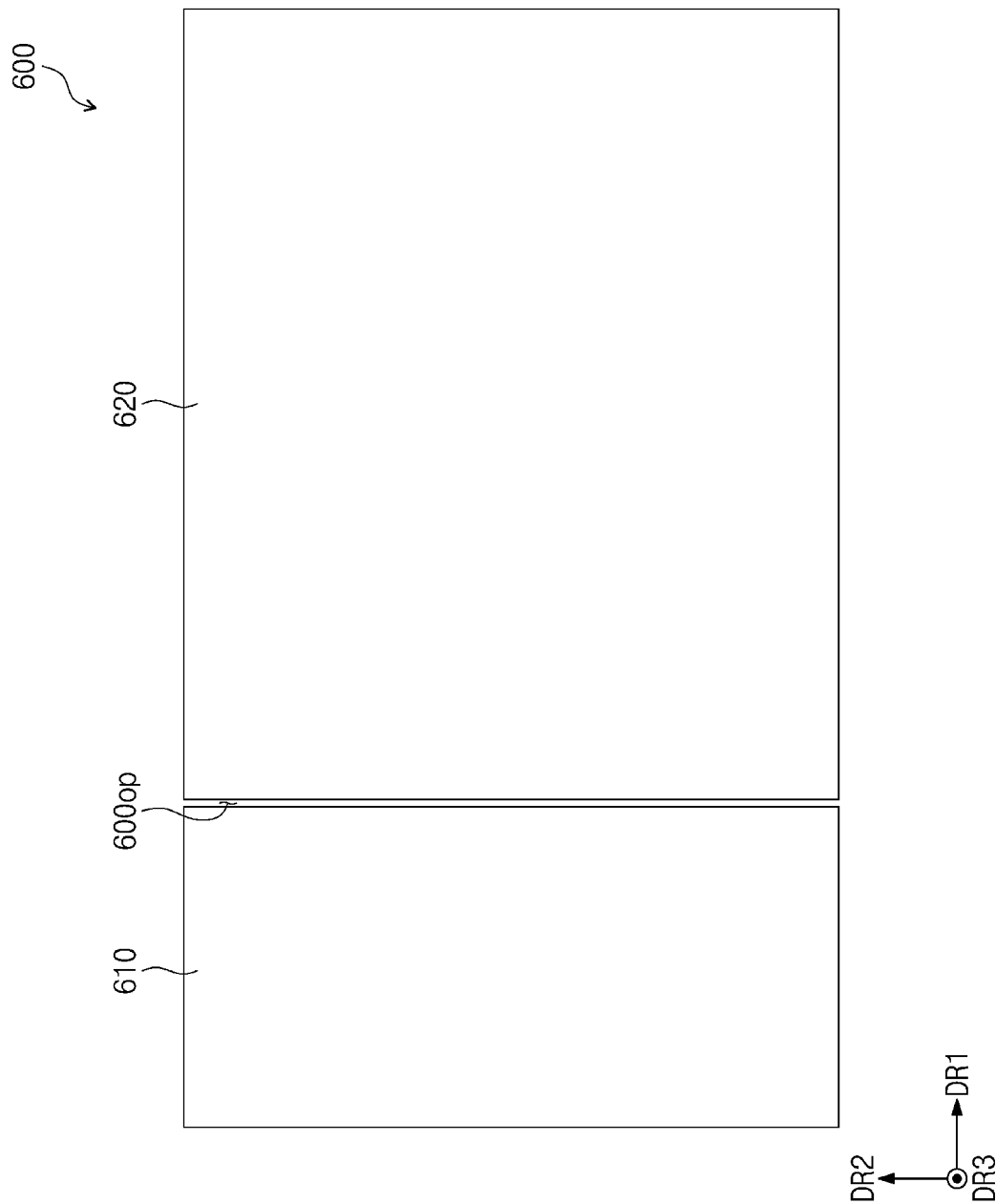
FIG. 4A is a schematic plan view of a barrier layer according to an embodiment of the disclosure.

FIG. 4A is a schematic plan view of a barrier layer according to an embodiment.

Referring to FIG. 4A, a barrier layer 600 may include a first barrier layer 610 and a second barrier layer 620. The first barrier layer 610 and the second barrier layer 620 may be completely separated from each other with respect to an opening 600op. The opening 600op may correspond to a gap between the first barrier layer 610 and the second barrier layer 620, and the opening 600op may be referred to as the gap.

Figure 4B:
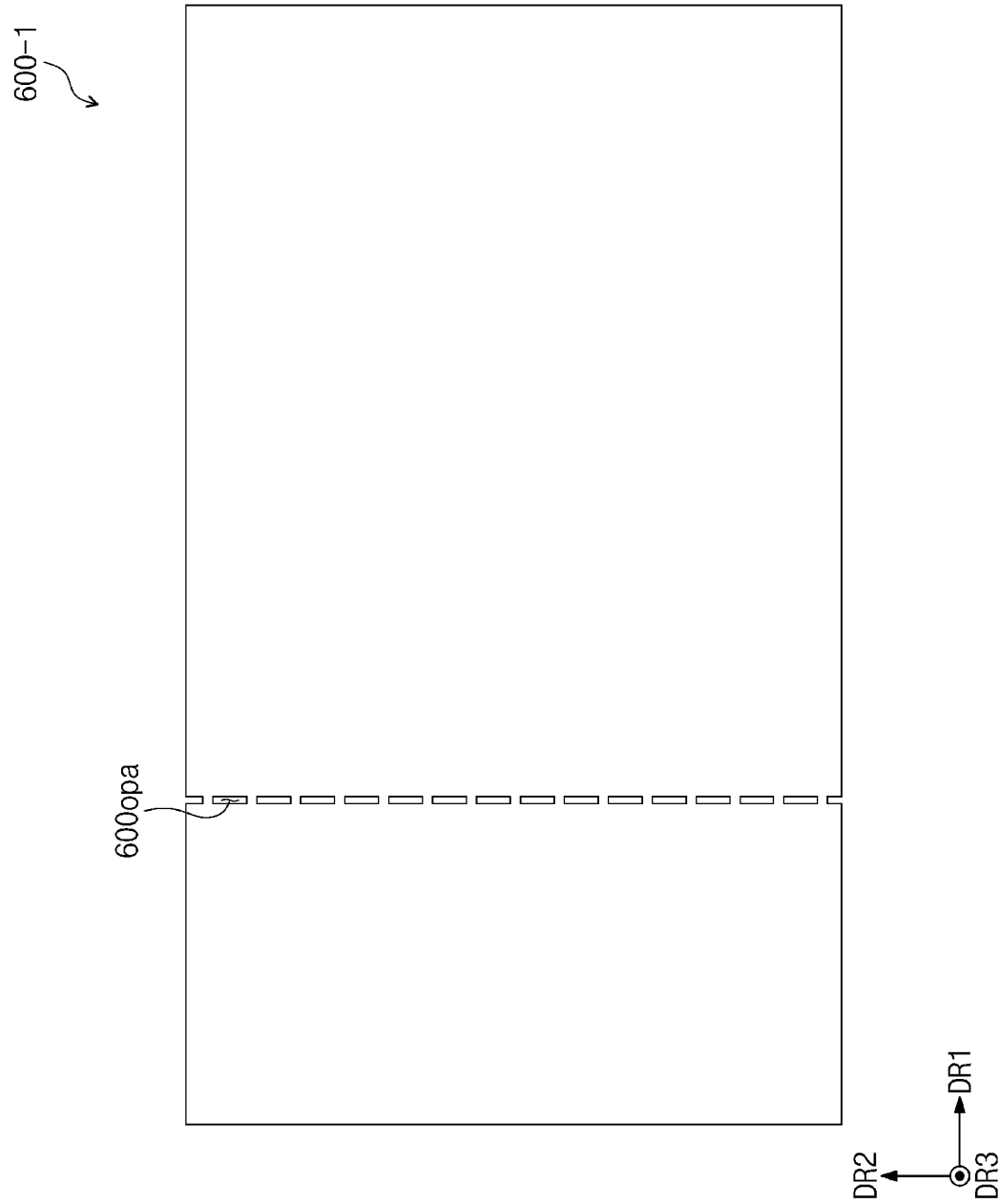
FIG. 4B is a schematic plan view of a barrier layer according to an embodiment of the disclosure.

FIG. 4B is a schematic plan view of a barrier layer according to an embodiment.

Referring to FIG. 4B, openings 600opa may be defined in a barrier layer 600-1. The openings 600opa may be spaced apart from each other in a second direction DR2. The direction in which the openings 600opa are arranged may correspond to the direction in which the first folding axis 1000FX1 (see FIG. 1) extends.

FIG. 5 is a schematic plan view of a lower plate according to an embodiment.

Referring to FIG. 5, a lower plate 800 may include a first lower plate 810 and a second lower plate 820. The first lower plate 810 and the second lower plate 820 may be spaced by a predetermined distance from each other. Slits 820s1 may be provided in the second lower plate 820. The slits 820s1 may be spaced apart from each other in a first direction DR1 and a second direction DR2.

FIG. 5 illustrates that each of the slits 820s1 has a rectangular shape, but the embodiment is not particularly limited thereto. Each of the slits 820s1 may have a circular or elliptical shape, and at least some of sides constituting each of the slits 820s1 may have a shape with a curvature.

Figure 6A:
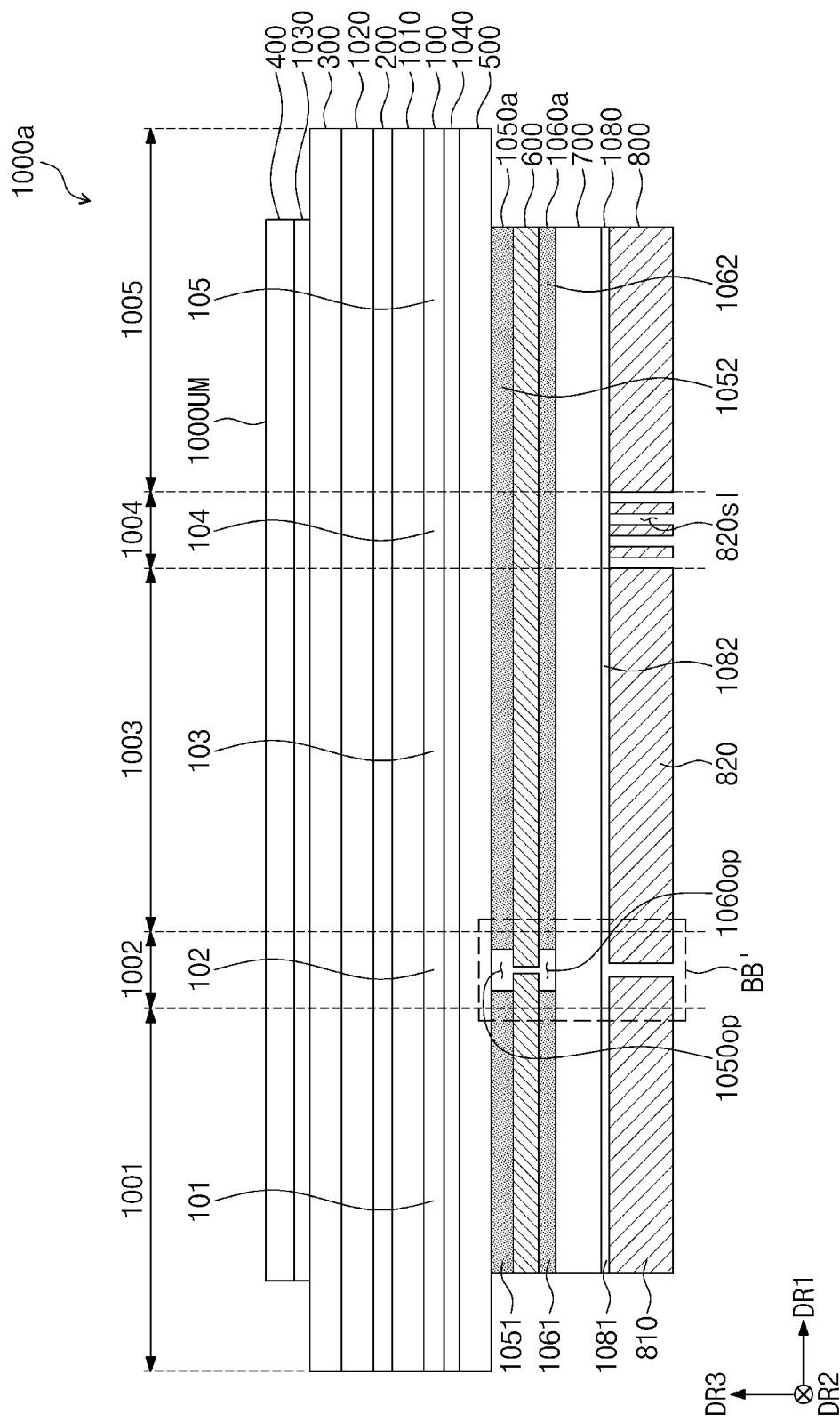
FIG. 6A is a schematic cross-sectional view of a display device according to an embodiment of the disclosure.
Figure 6B:
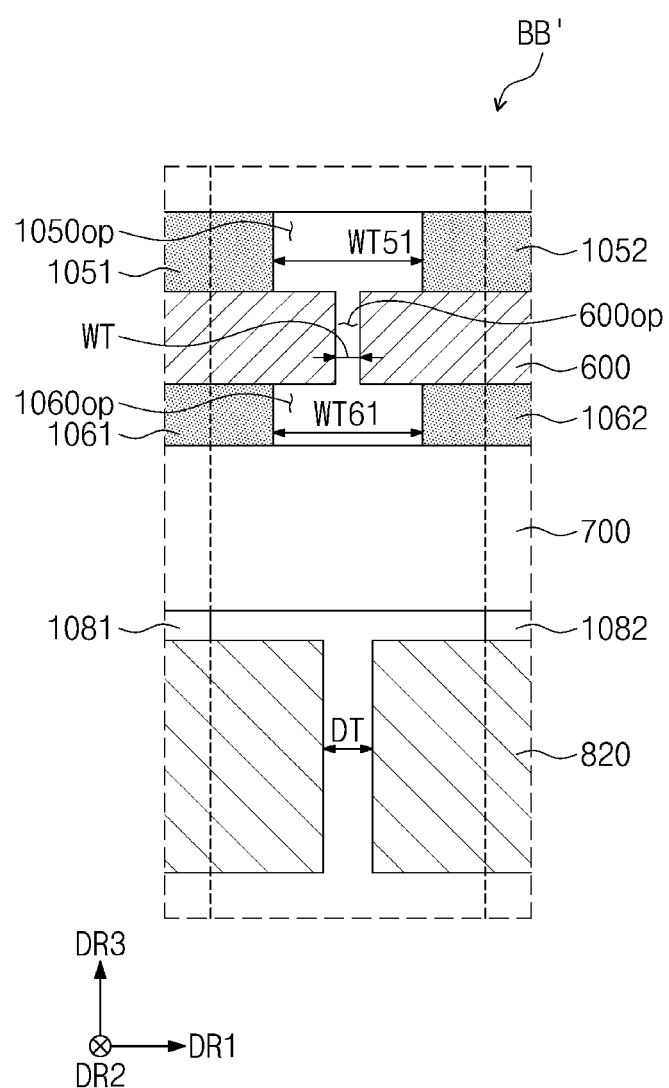
FIG. 6B is a schematic enlarged view illustrating BB' of FIG. 6A.

FIG. 6A is a schematic cross-sectional view of a display device according to an embodiment. FIG. 6B is a schematic enlarged view illustrating BB' of FIG. 6A. In describing FIGS. 6A and 6B, the same reference symbols are given to the same components as those shown in FIGS. 3A and 3B, and descriptions thereof will be omitted.

A display device 1000a illustrated in FIG. 6A may be different from the display device 1000 illustrated in FIG. 3A in terms of a first barrier adhesive layer 1050a and a second barrier adhesive layer 1060a.

Referring to FIGS. 6A and 6B, a portion, of the first barrier adhesive layer 1050a, overlapping the second area 102 and a portion, of the second barrier adhesive layer 1060a, overlapping the second area 102 may be removed. In case that the portion of the first barrier adhesive layer 1050a and the portion of the second barrier adhesive layer 1060a are removed, stress occurring in the barrier layer 600 may not be transferred to a peripheral portion of the barrier layer 600. In case that the display device 1000a is folded, the possibility that multiple neutral planes are formed may be increased in comparison with the structure(s) illustrated in FIGS. 3A and 3B. For example, a neutral plane may be defined in the barrier layer 600, and another neutral plane may be defined in the lower protective film 500. In case that multiple neutral planes are defined, the values of maximum compressive stress and maximum tensile stress may be reduced, compared to a case in which one neutral plane is provided.

The first barrier adhesive layer 1050a may be divided into a first sub-barrier adhesive section 1051 and a second sub-barrier adhesive section 1052 with respect to a first adhesive opening 1050op. The second barrier adhesive layer 1060a may be divided into a third sub-barrier adhesive section 1061 and a fourth sub-barrier adhesive section 1062 with respect to a second adhesive opening 1060op. Each of the first adhesive opening 1050op and the second adhesive opening 1060op may overlap the opening 600op.

A width WT51 of the first adhesive opening 1050op in the first direction DR1 may be identical to or different from a width WT61 of the second adhesive opening 1060op in the first direction DR1. Each of the width WT51 of the first adhesive opening 1050op in the first direction DR1 and the width WT61 of the second adhesive opening 1060op in the first direction DR1 may be equal to or greater than the width WT of the opening 600op in the first direction DR1.

Each of the width WT51 of the first adhesive opening 1050op in the first direction DR1 and the width WT61 of the second adhesive opening 1060op in the first direction DR1 may be equal to or greater than about 0 and equal to or less than about π×r. Here, r may be a radius of curvature of an outermost surface 1000UM of the display device 1000a corresponding to the second area 102 in case that the second area 102 is folded. The radius r of curvature may be the first radius R1 of curvature illustrated in FIG. 2.

At least one of the width WT51 of the first adhesive opening 1050op in the first direction DR1 and the width WT61 of the second adhesive opening 1060op in the first direction DR1 may be about 0. The width equal to 0 may indicate that the first adhesive opening 1050op or the second adhesive opening 1060op is not defined.

Since a portion below the second area 102 is sufficiently filled as each of the widths WT51 and WT61 is reduced, the possibility that creases are visually recognized in the second device area 1002 may be reduced. As each of the widths WT51 and WT61 increases, the possibility that stress occurring in the barrier layer 600 is transferred to the peripheral portion may be reduced. Therefore, the stress applied to the display device 1000a may be reduced. In addition, the value of each of the widths WT51 and WT61 may be selected from among values in a range of about 0 to about π×r by taking into consideration all factors such as crease visibility and stress reduction.

Figure 7:
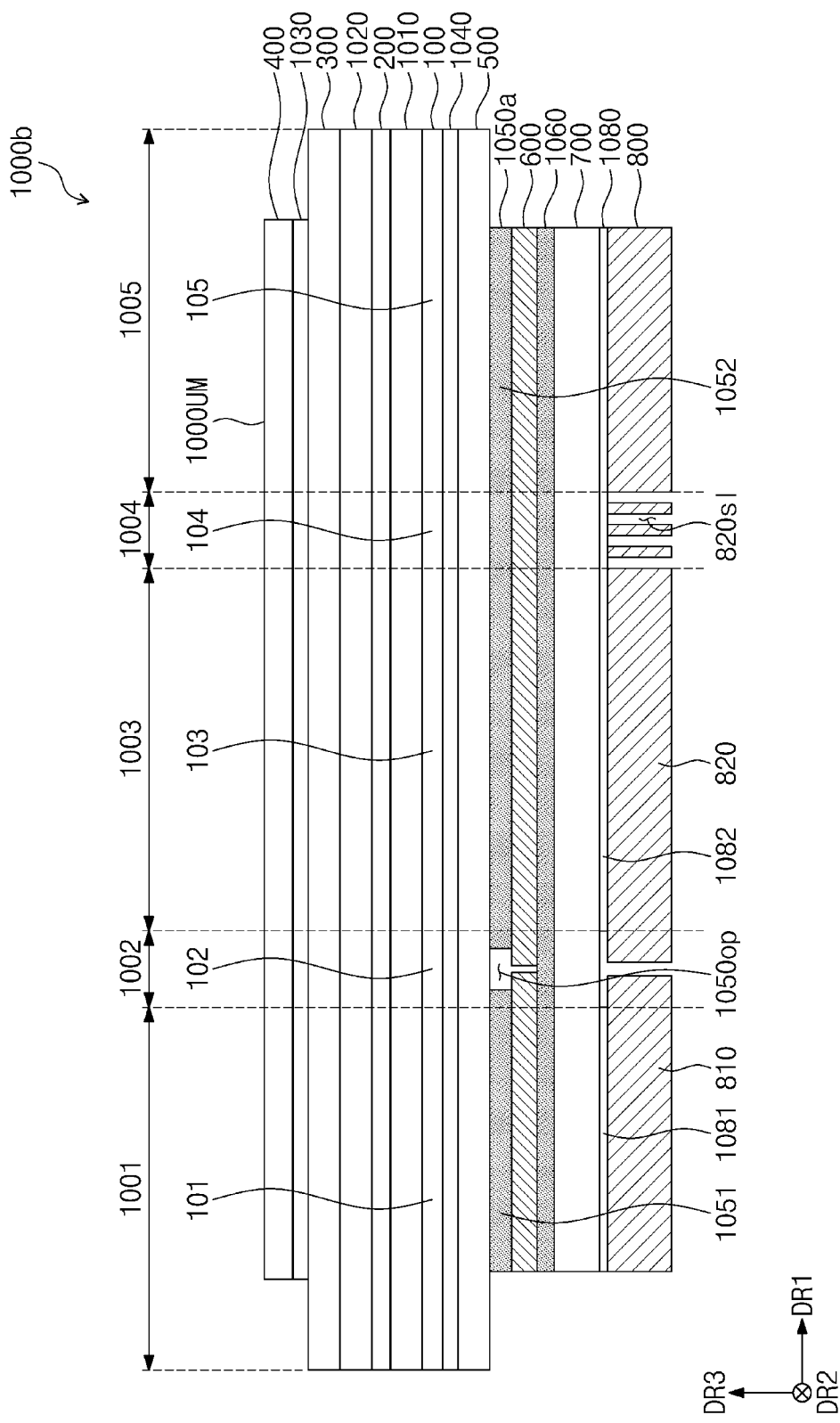
FIG. 7 is a schematic cross-sectional view of a display device according to an embodiment of the disclosure.

FIG. 7 is a schematic cross-sectional view of a display device according to an embodiment. In describing FIG. 7, same reference symbols are given to the same components as those shown in FIGS. 3A, 3B, 6A, and 6B, and descriptions thereof will be omitted.

Referring to FIG. 7, a display device 1000b may include a first barrier adhesive layer 1050a attached to a top surface of the barrier layer 600 and a second barrier adhesive layer 1060 attached to a bottom surface of the barrier layer 600. A first adhesive opening 1050op may be defined in the first barrier adhesive layer 1050a. The first adhesive opening 1050op may overlap an opening of the barrier layer 600.

Figure 8:
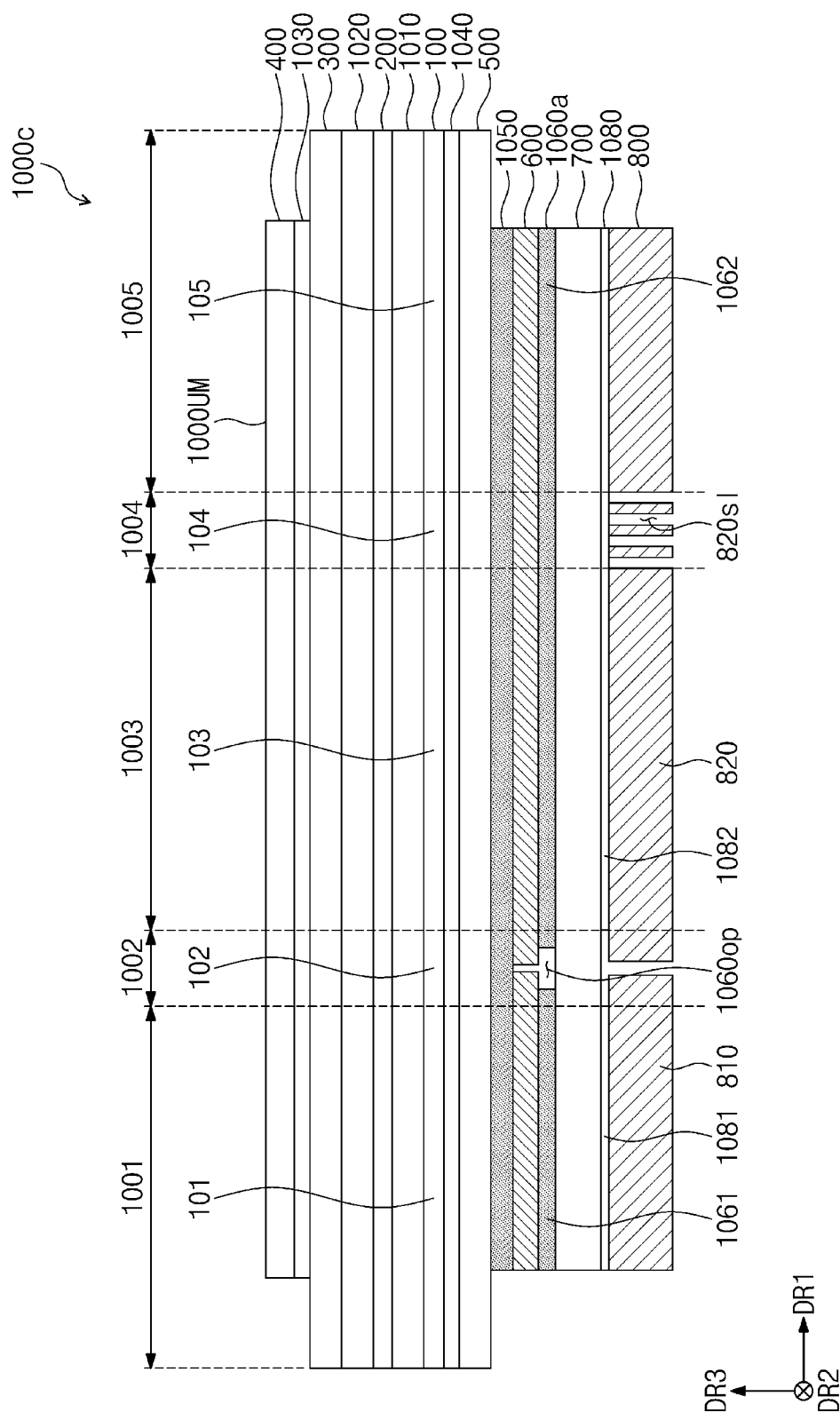
FIG. 8 is a schematic cross-sectional view of a display device according to an embodiment of the disclosure.

FIG. 8 is a schematic cross-sectional view of a display device according to an embodiment. In describing FIG. 8, the same reference symbols are given to the same components as those shown in FIGS. 3A, 3B, 6A, and 6B, and descriptions thereof will be omitted.

Referring to FIG. 8, a display device 1000c may include a first barrier adhesive layer 1050 attached to a top surface of the barrier layer 600 and a second barrier adhesive layer 1060a attached to a bottom surface of the barrier layer 600. A second adhesive opening 1060op may be defined in the second barrier adhesive layer 1060a. The second adhesive opening 1060op may overlap an opening of the barrier layer 600.

Figure 9A:
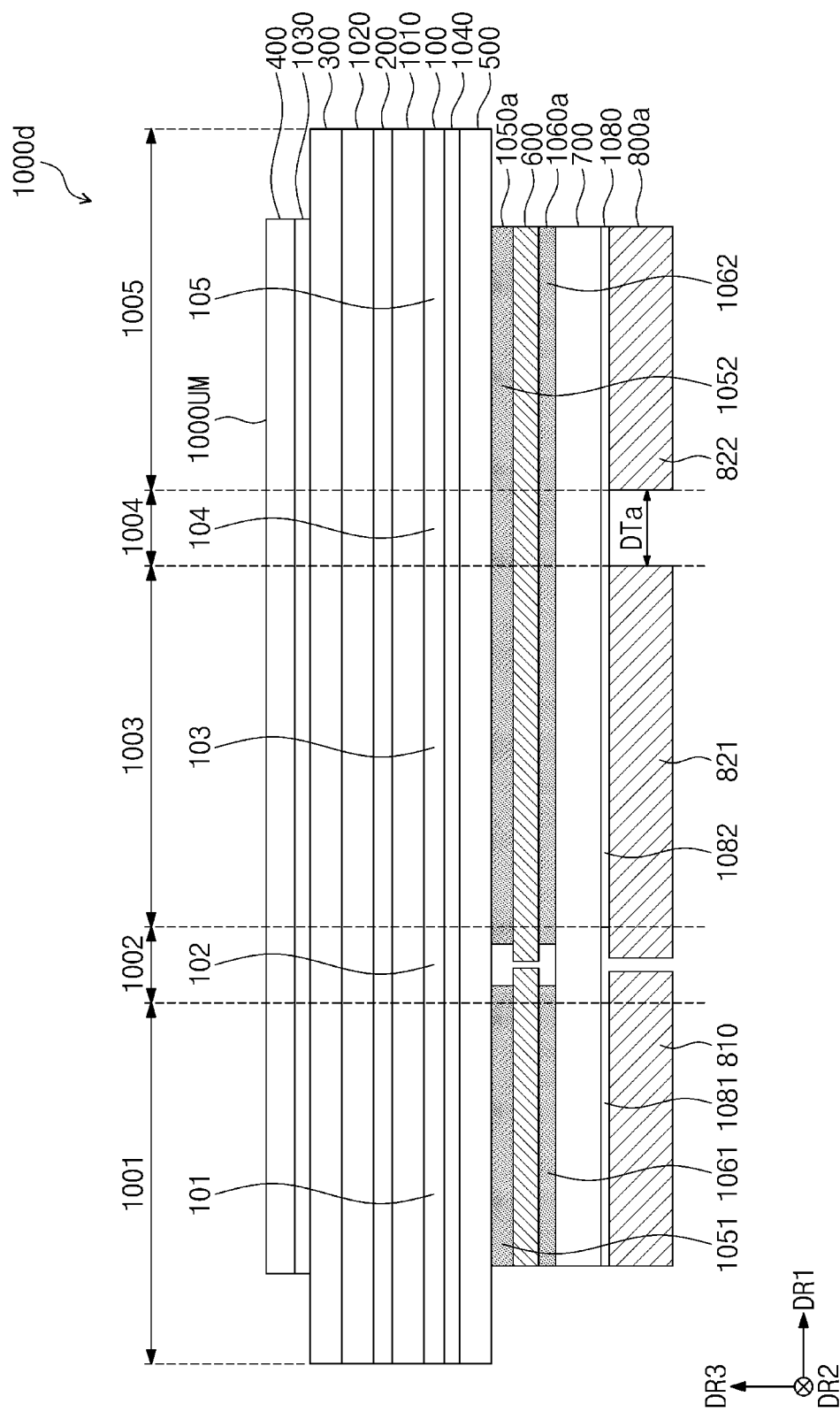
FIG. 9A is a schematic cross-sectional view of a display device according to an embodiment of the disclosure.
Figure 9B:
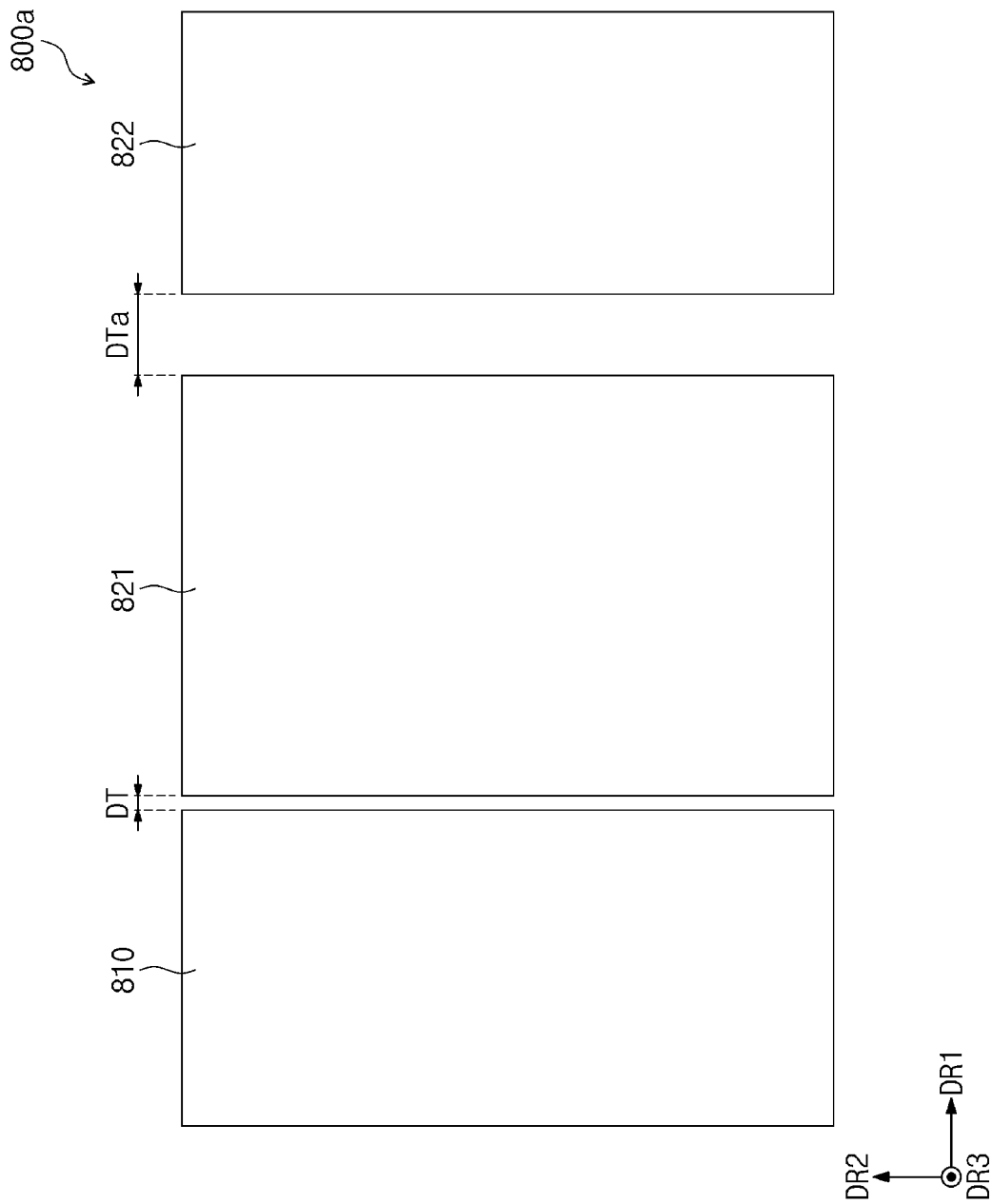
FIG. 9B is a schematic plan view of a lower plate illustrated in FIG. 9A.

FIG. 9A is a schematic cross-sectional view of a display device according to an embodiment. FIG. 9B is a schematic plan view of a lower plate illustrated in FIG. 9A. In describing FIGS. 9A and 9B, the same reference symbols are given to the same components as those shown in FIGS. 6A and 6B, and descriptions thereof will be omitted.

A display device 1000d illustrated in FIG. 9A may be different from the display device 1000a illustrated in FIG. 6A in terms of a lower plate 800a.

The lower plate 800a may include a first lower plate 810, a second lower plate 821, and a third lower plate 822. The first lower plate 810 may overlap the first area 101 and a portion of the second area 102, and the second lower plate 821 may overlap the third area 103 and another portion of the second area 102, and the third lower plate 822 may overlap the fifth area 105.

The first lower plate 810 and the second lower plate 821 may be spaced a first distance DT in a portion overlapping the second area 102, and the second lower plate 821 and the third lower plate 822 may be spaced a second distance DTa in portions thereof overlapping the fourth area 104. The second distance DTa may be equal to or greater than the width of the fourth area 104 in the first direction DR1. The second lower plate 821 and the third lower plate 822 may not overlap the fourth area 104.

For example, the second lower plate 821 and the third lower plate 822 may not be disposed in a portion overlapping the fourth device area 1004 which is out-folded. Therefore, in case that the fourth device area 1004 is folded, the second lower plate 821 and the third lower plate 822 may not interfere with each other. Although not illustrated, a hinge may be further provided in a portion between the second lower plate 821 and the third lower plate 822 in an unfolded state.

Figure 10:
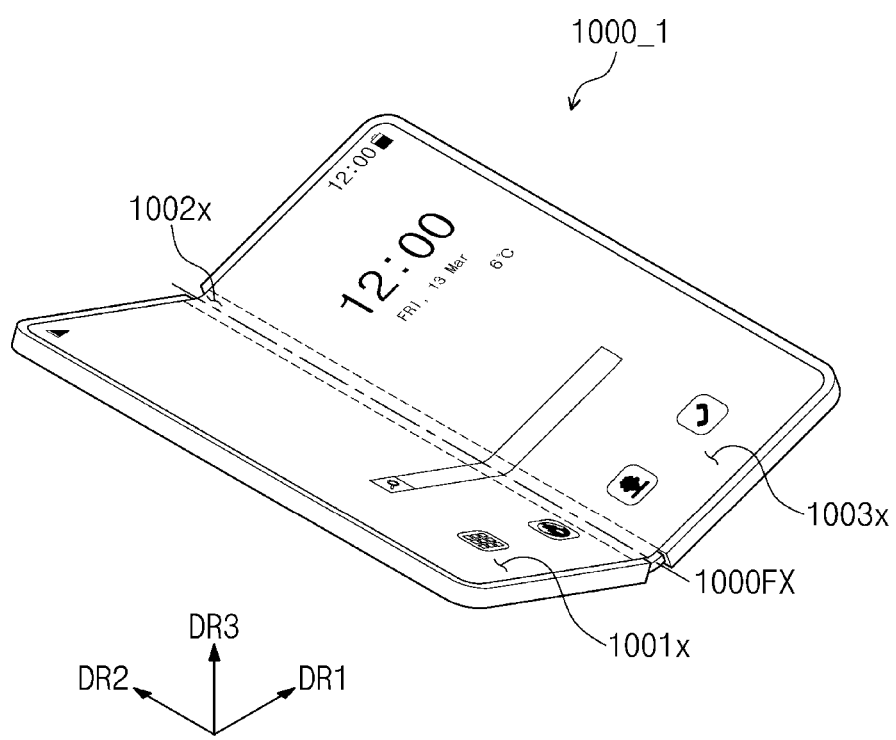
FIG. 10 is a schematic perspective view of a display device according to an embodiment of the disclosure.
Figure 11:
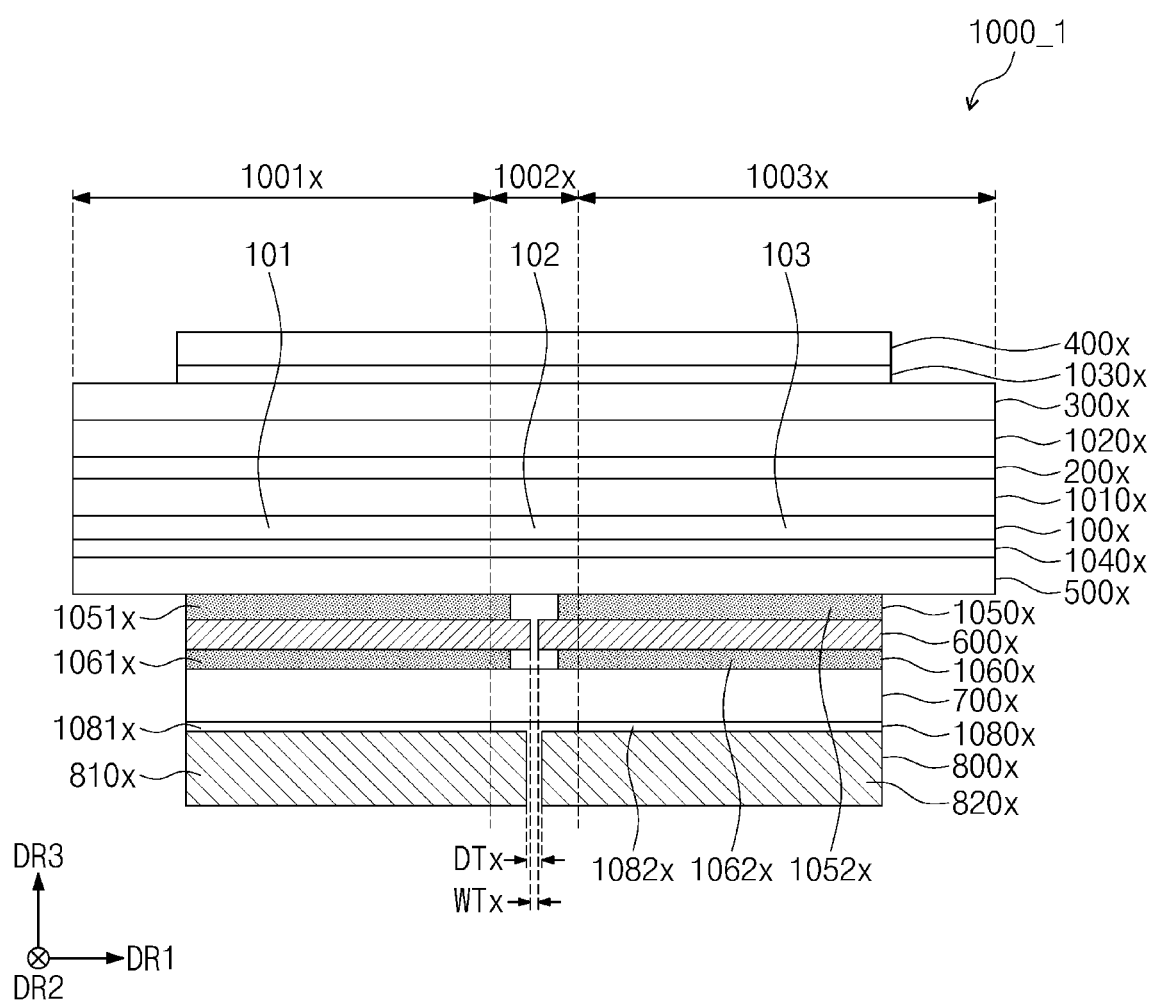
FIG. 11 is a schematic cross-sectional view of a display device according to an embodiment of the disclosure.

FIG. 10 is a schematic perspective view of a display device according to an embodiment. FIG. 11 is a schematic cross-sectional view of a display device according to an embodiment.

Referring to FIGS. 10 and 11, a display device 1000_1 may be a foldable display device. Unlike the embodiments described above, only a folding area may be defined in the display device 1000_1 illustrated in FIGS. 10 and 11.

In the display device 1000_1, a first device area 1001x, a second device area 1002x, and a third device area 1003x may be sequentially defined in a first direction DR1. The first device area 1001x and the third device area 1003x may be areas that are not folded and may be referred to as non-folding areas. The second device area 1002x may be an area that is folded or unfolded. The second device area 1002x may be a foldable area and thus may be referred to as a folding area. The second device area 1002x may be an area that is foldable about a folding axis 1000FX extending in a second direction DR2.

The display device 1000_1 may include a display panel 100x, an anti-reflection member 200x, a window 300x, a protective film 400x, a lower protective film 500x, a barrier layer 600x, a cushion layer 700x, a lower plate 800x, first to fourth adhesive layers 1010x, 1020x, 1030x, and 1040x, first and second barrier adhesive layers 1050x and 1060x, and a lower adhesive layer 1080x.

The lower plate 800x may include a first lower plate 810x and a second lower plate 820x. The first lower plate 810x and the second lower plate 820x may be spaced by a predetermined distance DTx from each other. The lower adhesive layer 1080x may include a first lower adhesive layer 1081x attached to the first lower plate 810x and a second lower adhesive layer 1082x attached to the second lower plate 820x.

The barrier layer 600x may be provided between the display panel 100x and the lower plate 800x. The barrier layer 600x may have a modulus of elasticity sufficient to prevent the shape thereof from being readily deformed by the foreign substances. The barrier layer 600x may have a role in preventing foreign substances introduced from below the barrier layer 600x from being visually recognized from the outside.

An opening may be defined in a portion of the barrier layer 600x overlapping the second device area 1002x. As the opening is provided, the stress applied to the portion of the barrier layer 600x overlapping the second device area 1002x may be reduced, and thus the possibility that a crack occurs in the barrier layer 600x may be reduced or eliminated. A width WTx of the opening of the barrier layer 600x may be less than the predetermined distance DTx.

The first barrier adhesive layer 1050x may be divided into a first sub-barrier adhesive section 1051x and a second sub-barrier adhesive section 1052x, and the second barrier adhesive layer 1060x may be divided into a third sub-barrier adhesive section 1061x and a fourth sub-barrier adhesive section 1062x.

Each of the gap between the first sub barrier adhesive section 1051x and the second sub-barrier adhesive section 1052x and the gap between the third-sub barrier adhesive section 1061x and the fourth-sub barrier adhesive section 1062x may be equal to or greater than about 0 and equal to or less than about $\pi \times r$. Here, r may be a radius of curvature of an uppermost surface 1000UM (see FIG. 2) of the display device 1000_1 corresponding to a second area 102 in case that the second area 102 is folded. The radius r of curvature may be the first radius R1 (see FIG. 2) of curvature illustrated in FIG. 2.

As described above, the barrier layer, which is disposed between the display panel and the first lower plate and between the display panel and the second lower plate, may prevent foreign substances, introduced from below the barrier layer, from being visually recognized from the outside. As the opening is provided in a portion of the barrier layer, stress applied to the portion of the barrier layer overlapping the folding area may be reduced, and thus the possibility that a crack occurs in the barrier layer may be reduced or eliminated.

Although described with reference to the embodiments of the disclosure, it will be understood that various changes and modifications of the disclosure may be made by one ordinary skilled in the art or one having ordinary knowledge in the art without departing from the spirit and technical field of the disclosure as hereinafter claimed. Hence, the technical scope of the disclosure is not limited to the detailed description in the specification.

What is claimed is:

1. A display device comprising:
a display panel which includes a first area, a second area that is folded and unfolded, and a third area sequentially disposed in a first direction;
a barrier layer which is disposed below the display panel and includes at least one opening overlapping the second area;
a first lower plate which is disposed below the barrier layer and overlaps the first area and a portion of the second area; and
a second lower plate which is disposed below the barrier layer and overlaps the third area and another portion of the second area,
wherein a width of the at least one opening in the first direction is less than a distance between the first lower plate and the second lower plate in the first direction.

2. The display device of claim 1, wherein
the display panel further comprises a fourth area and a fifth area which are disposed in the first direction from the third area,
the fourth area is folded and unfolded,
the first area and the third area face each other in case that the second area is folded, and
the third area and the fifth area are opposite to each other in case that the fourth area is folded.

3. The display device of claim 2, wherein
the second lower plate further overlaps the fourth area and the fifth area, and
the barrier layer overlaps the first area, the second area, the third area, the fourth area, and the fifth area.

4. The display device of claim 2, wherein the second lower plate includes a plurality of slits overlapping the fourth area.

5. The display device of claim 4, wherein the barrier layer overlaps all of the plurality of slits in a plan view.

6. The display device of claim 1, wherein
the barrier layer comprises a first barrier layer and a second barrier layer, and
the first barrier layer and the second barrier layer are separated from each other with respect to the at least one opening.

7. The display device of claim 1, wherein
the at least one opening includes a plurality of openings, and
the plurality of openings are arranged in a second direction intersecting the first direction.

8. The display device of claim 1, further comprising:
a first barrier adhesive layer attached to a top surface of the barrier layer; and
a second barrier adhesive layer attached to a bottom surface of the barrier layer.

9. The display device of claim 8, wherein
the at least one opening extends from the top surface of the barrier layer toward the bottom surface of the barrier layer, and
at least one of the first barrier adhesive layer and the second barrier adhesive layer overlaps the at least one opening.

10. The display device of claim 8, wherein
the first barrier adhesive layer includes a first adhesive opening,
the second barrier adhesive layer includes a second adhesive opening, and
all of the first adhesive opening, the at least one opening, and the second adhesive opening overlap each other.

11. The display device of claim 10, wherein each of a width of the first adhesive opening in the first direction and a width of the second adhesive opening in the first direction is greater than or equal to the width of the at least one opening in the first direction.

12. The display device of claim 10, wherein
each of a width of the first adhesive opening in the first direction and a width of the second adhesive opening in the first direction is greater than about 0 and equal to or less than $\pi \times r$, and r is a radius of curvature of an uppermost surface of the display device corresponding to the second area in case that the second area is folded.

13. The display device of claim 1, wherein the width of the at least one opening in the first direction is greater than about 0 micrometer and equal to or less than about 100 micrometers.

14. The display device of claim 1, wherein a modulus of elasticity of the barrier layer is in a range of about 30 GPa to about 200 GPa.

15. The display device of claim 1, wherein the barrier layer comprises at least one of stainless steel, invar, glass, and a titanium alloy.

16. A display device comprising:
a display panel which includes a first area, a second area that is folded and unfolded, a third area, a fourth area that is folded and unfolded, and a fifth area sequentially disposed in a first direction; and
a barrier layer which is disposed below the display panel, wherein
the first area and the third area face each other in case that the second area is folded,
the third area and the fifth area are opposite to each other in case that the fourth area is folded,
each of the first area, the second area, the third area, the fourth area, and the fifth area includes a display layer for displaying an image, and
the barrier layer overlaps the first area, the third area, an entirety of the fourth area, and the fifth area and includes at least one opening overlapping the display layer of the second area of the display panel.

17. The display device of claim 16, wherein a radius of curvature of an uppermost surface of the display device corresponding to the second area is less than a radius of curvature of an uppermost surface of the display device corresponding to the fourth area.

18. The display device of claim 16, further comprising:
a first barrier adhesive layer attached to a top surface of the barrier layer; and
a second barrier adhesive layer attached to a bottom surface of the barrier layer, wherein
at least one of the first barrier adhesive layer and the second barrier adhesive layer includes an adhesive opening overlapping the at least one opening.

19. The display device of claim 16, further comprising:
an adhesive layer disposed between the display panel and the barrier layer.

20. The display device of claim 16, further comprising:
a first lower plate which is disposed below the barrier layer and overlaps the first area and a portion of the second area; and
a second lower plate which is disposed below the barrier layer and overlaps the third area, the fourth area, the fifth area, and another portion of the second area, wherein
the second lower plate includes a plurality of slits overlapping the fourth area.

* * * * *